United States Patent [19]

Joh

[11] Patent Number: 4,819,953

[45] Date of Patent: Apr. 11, 1989

[54] CYLINDER HEAD COVER WITH GASKET AND METHOD OF MAKING THE GASKET

[75] Inventor: Günter Joh, Gelnhausen, Fed. Rep. of Germany

[73] Assignee: Karl Joh Gummiwarenfabrik GmbH, Gelnhausen, Fed. Rep. of Germany

[21] Appl. No.: 119,685

[22] Filed: Nov. 12, 1987

[30] Foreign Application Priority Data

Nov. 15, 1986 [DE] Fed. Rep. of Germany ....... 3639218

[51] Int. Cl.⁴ ............................ F16J 15/06; C07F 7/10
[52] U.S. Cl. ................................ 277/235 B; 549/215
[58] Field of Search ............. 123/193, 195 C, 198 E; 549/215; 277/1, 166, 235 B, 189

[56] References Cited

U.S. PATENT DOCUMENTS

| | | | |
|---|---|---|---|
| 4,192,520 | 3/1980 | Hasegawa | 277/235 B |
| 4,206,931 | 6/1980 | Tomita et al. | 277/166 |
| 4,284,479 | 8/1981 | Schulte | 277/1 |
| 4,456,268 | 6/1984 | Penn et al. | 277/166 X |
| 4,501,432 | 2/1985 | Kuniyoshi et al. | 277/235 B X |
| 4,575,578 | 3/1986 | Bogan et al. | 277/189 X |
| 4,673,750 | 6/1987 | Beers et al. | 549/215 |

FOREIGN PATENT DOCUMENTS

| | | |
|---|---|---|
| 3016673 | 11/1980 | Fed. Rep. of Germany . |
| 3113912 | 10/1982 | Fed. Rep. of Germany . |
| 3216318 | 12/1982 | Fed. Rep. of Germany . |
| 1035878 | 4/1953 | France . |

OTHER PUBLICATIONS

Dept. of Army Technical Manual TM9-8000.
Dept. of Air Force Technical Manual To 36A-1-76.
Department of Army and Air Force, Jan. 1956, Principles of Automotive Vehicles, p. 54.

*Primary Examiner*—Donald A. Griffin
*Attorney, Agent, or Firm*—Peter K. Kontler

[57] ABSTRACT

A cylinder head cover wherein the pan-shaped metallic body has a marginal portion with a groove for a portion of a gasket which is formed on the marginal portion prior to attachment of the cover to the cylinder head of an internal combustion engine. The underside of the marginal portion is coated with one or more layers of a coupling agent and a mold is placed over the marginal portion to define therewith an endless cavity which receives a supply of plasticized silicon rubber at an elevated temperature. The injected material is then heated to vulcanization temperature and is thereupon allowed or caused to set by cooling so that it forms an elastic sealing ring which is bonded to the marginal portion of the cover by the coupling agent. The mold is then removed from the marginal portion and the cover is secured to the cylinder head by fasteners which extend through the bottom wall of the pan-shaped body and are surrounded by noise-damping elastic sealing rings.

14 Claims, 2 Drawing Sheets

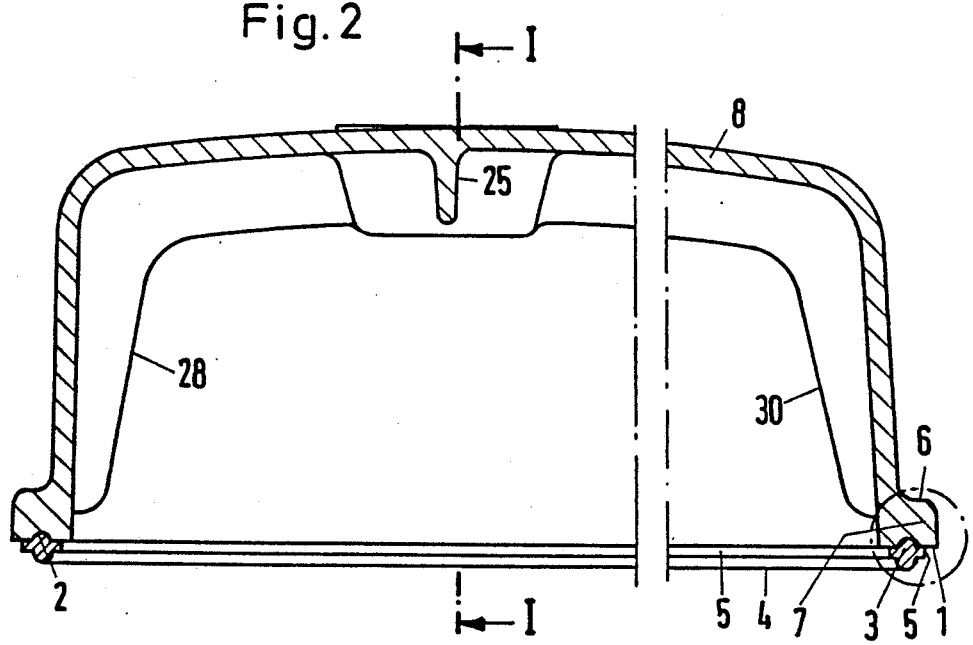
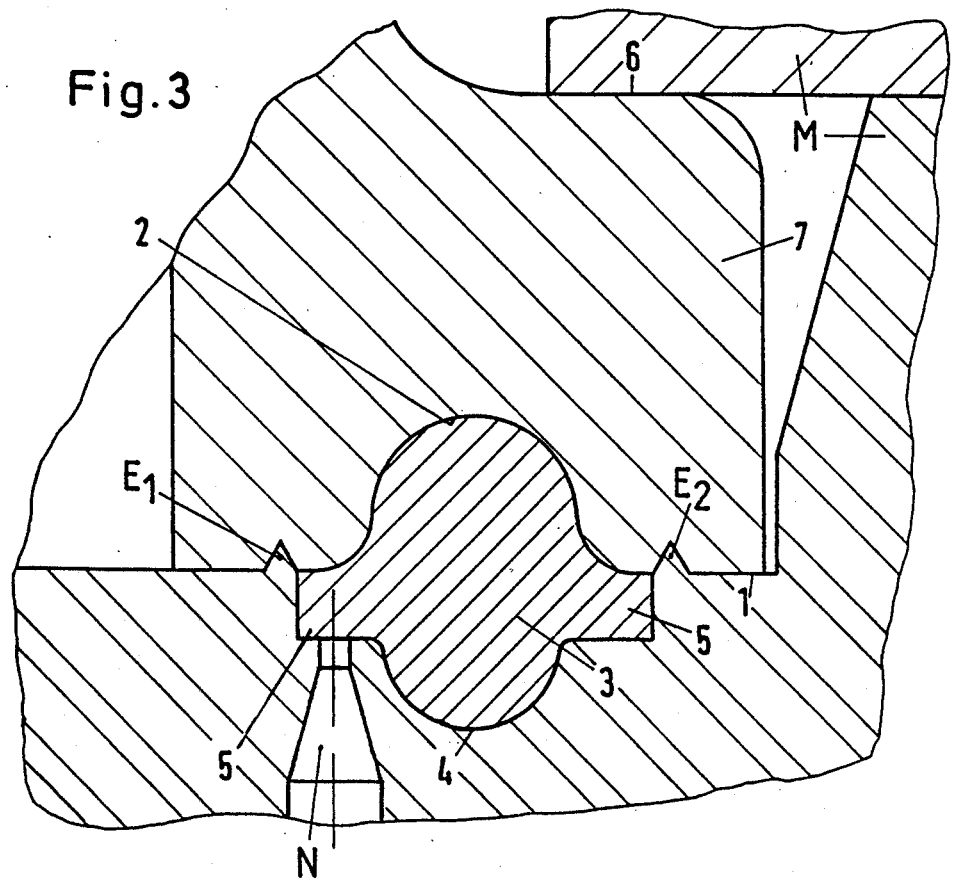

CYLINDER HEAD COVER WITH GASKET AND METHOD OF MAKING THE GASKET

CROSS-REFERENCE TO RELATED APPLICATIONS

The method of making the gasket of the present invention is somewhat similar to the method which is disclosed in the copending patent application Ser. No. 121,266 of Günter Joh et al. filed Nov. 16, 1987 for "Intake Manifold and Method of Making the Same".

BACKGROUND OF THE INVENTION

The invention relates to improvements in internal combustion engines, and more particularly to improvements in covers for cylinder heads of internal combustion engines. Still more particularly, the invention relates to improvements in sealing means for cylinder head covers and to a method of making such sealing means.

The cover of a cylinder head in an internal combustion engine is attached to the cylinder head by means of fasteners and with the interposition of a so-called cover gasket which ensures that the cavity which is defined by the body of the cover is adequately sealed from the surrounding atmosphere by the establishment of a reliable seal between the marginal portion of the body of the cover and the adjacent portion of the cylinder head. French Pat. No. 1,035,878 to Niquet discloses a cylinder head cover wherein the marginal portion of the cover has a circumferentially complete dovetailed groove for a separately produced sealing gasket constituting a ring with a circular cross-sectional outline. Fastener means are provided to secure the cover to the cylinder head and to deform the ring into sealing engagement with the surfaces surrounding the dovetailed groove and into sealing engagement with the adjacent portion of the cylinder head. The sealing ring is vulcanized to the cover in an operation which follows the placing of the ring into the groove. Thus, the sealing ring is produced as a separate part which is thereupon inserted into the groove of the cover, and the sealing ring is thereupon treated to adhere to the cover. This is a time-consuming and costly operation because it involves the making of a sealing ring independently of the cover, forcing the thus produced ring into the groove of the cover, and additional treatment of the ring in order to ensure the establishment of an adequate seal between the ring and the cover. The sealing action of such gaskets is not entirely satisfactory, especially as concerns the seal between the ring and the cover.

German Offenlegungsschrift No. 31 13 912 of Hemmrich discloses a cover which has a marginal portion with an outwardly extending flange serving to overlie a similar flange on the cylinder head. The flanges are separated by a flat ring-shaped portion of a sealing element which further comprises a U-shaped outer portion serving to partially overlie the two flanges. A ring-shaped clamp is provided to bias the legs of the U-shaped portion against the outer sides of the respective flanges and to thus deform the flat-ring-shaped portion between the flanges. The sealing element can be vulcanized or adhesively secured to the clamp. A drawback of this proposal is that the sealing element and the clamp must be produced in separate machines and must be assembled prior to their application to the flanges of the cover and cylinder head. Moreover, it is necessary to provide the cylinder head with a flange which contributes significantly to the cost of the cylinder head. Still further, and since the clamp must be expanded prior to placing it around the flanges of the cover and cylinder head, it is necessary to greatly expand the sealing element prior to tightening of the clamp around the two flanges. Alternatively, the sealing element must constitute a split ring which presents problems in connection with adequate sealing when the clamp is tightened around the flanges. The utilization of an uninterrupted circumferentially complete sealing ring invariably entails excessive or, at the very least, very pronounced localized stretching and subsequent contraction of the sealing element which affects its sealing action when the cover is affixed to the cylinder head. In order to avoid undesirable and excessive localized stretching and subsequent contraction of the sealing element, it would be necessary to make the sealing element of two or more pieces and to employ a composite clamp with two or more pairs of outwardly extending lugs which are to be secured to each other by discrete screws, bolts and nuts or like fastening elements. Alternatively, the clamp could be provided with several hinges which would contribute to its initial cost and would constitute weak spots as far as the sealing action is concerned. As a rule, a cylinder head cover has a rectangular outline so that it would be necessary to provide at least three hinges.

German Offenlegungsschrift No. 32 16 318 of Skatsche et al. discloses sound absorbing elements (12) each of which includes a rigid inner sleeve (13), a rigid outer sleeve (15) which has a flange (14), and a body (16) of elastic material which is vulcanized between the two sleeves. The sound absorbing elements are secured to yokes (9) by means of screws (17) which extends through the inner sleeves. The just described arrangement cannot provide a fluid-tight seal; it is used solely to reduce the transmission of sound.

Applicant is further aware of German Offenlegungsschrift No. 30 16 673 of Kirchweger which discloses means for reducing the transmission of sound from an internal combustion engine. The cover for the cylinder head deforms a gasket under the action of fasteners which secure the cover to the cylinder head and are surrounded by sound-absorbing rings. The fasteners are simple screws with slotted or recessed heads. This publication does not discuss the mode of making and/or applying the gasket between the cover and the cylinder head.

A drawback of all prior proposals regarding the establishment of a reliable seal between the cover and the cylinder head of an internal combustion engine is that the gasket must be produced as a separate part which is thereupon inserted into a groove of the cover or into a clamp. This contributes to the initial cost of the gasket and/or complicates the attachment of the cover and gasket to the cylinder head. Manual work cannot be avoided so that the afore-discussed prior proposals are not suitable for application in modern production lines wherein the parts of engines are assembled by robots.

Certain other prior proposals involve the provision of a non-elastic gasket which is to be introduced into a groove in the marginal portion of the body of the cover. In order to ensure reliable insertion of the non-elastic gasket, the groove must be at least slightly larger than the corresponding portion of the gasket so that the gasket is a loose fit in the groove and the sealing action of such gasket is nil or unsatisfactory. Attempts to overcome the drawbacks of such non-elastic gaskets include the provision of lateral ribs which project from the gasket and are to overlie the adjacent portions of the cover and cylinder head. The sealing action of such modified non-elastic gaskets is satisfactory only if the surfaces which contact the ribs are machined with a high degree of precision which contributes to the initial cost of the cover and of the cylinder head. When the cover is secured to the cylinder head, the ribs of the gasket undergo permanent deformation so that the gasket cannot be reused. Moreover, the gasket is invariably weakened in regions where it is traversed by the fasteners which secure the cover to the cylinder head so that the sealing action in the regions of the fasteners is less satisfactory or nil. The situation is similar if the marginal portion of the cover is not formed with a groove for a portion of a non-elastic gasket and if the marginal portion of the cover has a flange with holes for fasteners which secure the cover to the cylinder head. In addition, proper centering of a gasket which cannot be inserted into a groove of the cover presents problems and contributes to complexity of application of such cover to a cylinder head.

OBJECTS AND SUMMARY OF THE INVENTION

An object of the invention is to provide a novel and improved cover for the cylinder head of an internal combustion engine and to provide the cover with a novel and improved gasket which establishes a reliable seal between the body of the cover and the cylinder head.

Another object of the invention is to provide a novel and improved gasket for use on the cover for a cylinder head.

A further object of the invention is to provide a cover which is constructed and assembled in such a way that it can be attached to or detached from a cylinder head in a simple and timesaving operation.

An additional object of the invention is to provide novel and improved means for fastening the cover to the cylinder head.

Still another object of the invention is to provide novel and improved means for sealingly installing the fastening means in the cover.

A further object of the invention is to provide a novel and improved method of providing the body of a cover for a cylinder head with a gasket.

Another object of the invention is to provide an engine which embodies the above outlined cover and wherein the cover is secured to the cylinder head by means of the above outlined gasket.

One feature of the present invention resides in the provision of a cylinder head cover which comprises a hollow body defining at least one cavity and having a marginal portion which surrounds the cavity and can be placed adjacent a cylinder head in an internal combustion engine, and a novel and improved cover gasket which is provided on the marginal portion of the body and includes a sealing element of elastic material and at least one coupling agent between the sealing element and the marginal portion. The elastic material is applied at an elevated temperature in plasticized state and has a predetermined outline as a result of shaping during cooling following the application at elevated temperature.

The marginal portion can be provided with a recess (particularly with a circumferentially complete groove) for a portion of the gasket. The surface bounding the groove is coated with the coupling agent which can form one or more layers. The marginal portion can include or constitute an outwardly extending flange of the body which latter can be made of aluminum or another metallic material.

The body is further provided with at least one hole which is spaced apart from the marginal portion and communicates with the cavity. The hole receives an elongated fastener which serves to secure the body to a cylinder head, and an intermediate portion of the fastener is sealingly surrounded by an elastic sealing ring which is installed in the hole and is in sealing engagement with the body. The ring is deformable in response to application of the fastener to deform the gasket between the marginal portion of the body and a cylinder head.

The body can resemble a pan having a bottom wall which is provided with the hole and a sidewall which is integral with and extends from one side of the bottom wall and includes the marginal portion.

The fastener can include a stud bolt having spaced apart first and second externally threaded portions (e.g., the end portions of the bolt). One of the externally threaded portions can be caused to mesh with an internally threaded portion of a cylinder head and the other externally threaded portion can mate with a nut externally of the body to urge the marginal portion of the body toward the cylinder head whereby the gasket undergoes deformation the extent of which is dependent on the distance between the externally threaded portions of the stud bolt.

The improved cover can further comprise two metallic washers which are preferably embedded into the end faces of the sealing ring and have exposed surfaces one of which can bear against the body when the fastener is applied to secure the body to cylinder head. The exposed surface of the other washer can be (directly or indirectly) engaged by the aforementioned nut.

The body can be provided with reinforcing means, especially in the form of one or more stiffening ribs in the cavity.

Another feature of the invention resides in the provision of a method of forming a sealing gasket on a cylinder head cover of the type having a hollow body defining at least one cavity and including a marginal portion which can be placed adjacent a cylinder head and surrounds the cavity. The method comprises the steps of coating the marginal portion of the body with at least one layer of a coupling agent (such as silane), applying over the coupling agent a mass of plasticized elastomeric material (such as silicon rubber, nitryl rubber or polyacrylate rubber) which sets in response to cooling and thereby adheres to the coupling agent (which, in turn, adheres to the marginal portion of the body), shaping the thus applied mass of elastomeric material so as to impart thereto the configuration of a sealing element having a predetermined cross-sectional outline which is best suited to sealingly engage the cylinder head, and cooling the shaped elastomeric material.

The applying step can include injecting the plasticized material between the at least one layer of coupling agent and a mold which determines the outline of the sealing element.

The novel features which are considered as characteristic of the invention are set forth in particular in the appended claims. The improved cover itself, however, both as to its construction and the mode of making its gasket, together with additional features and advan-

BRIEF DESCRIPTION OF THE DRAWING

FIG. 2 is an enlarged sectional view as seen in the direction of arrows from the line II—II of FIG. 1; and FIG. 3 is an enlarged view of a detail within the phantom-line circle in the lower right-hand portion of FIG. 2.

DESCRIPTION OF THE PREFERRED EMBODIMENTS

Figure 1:
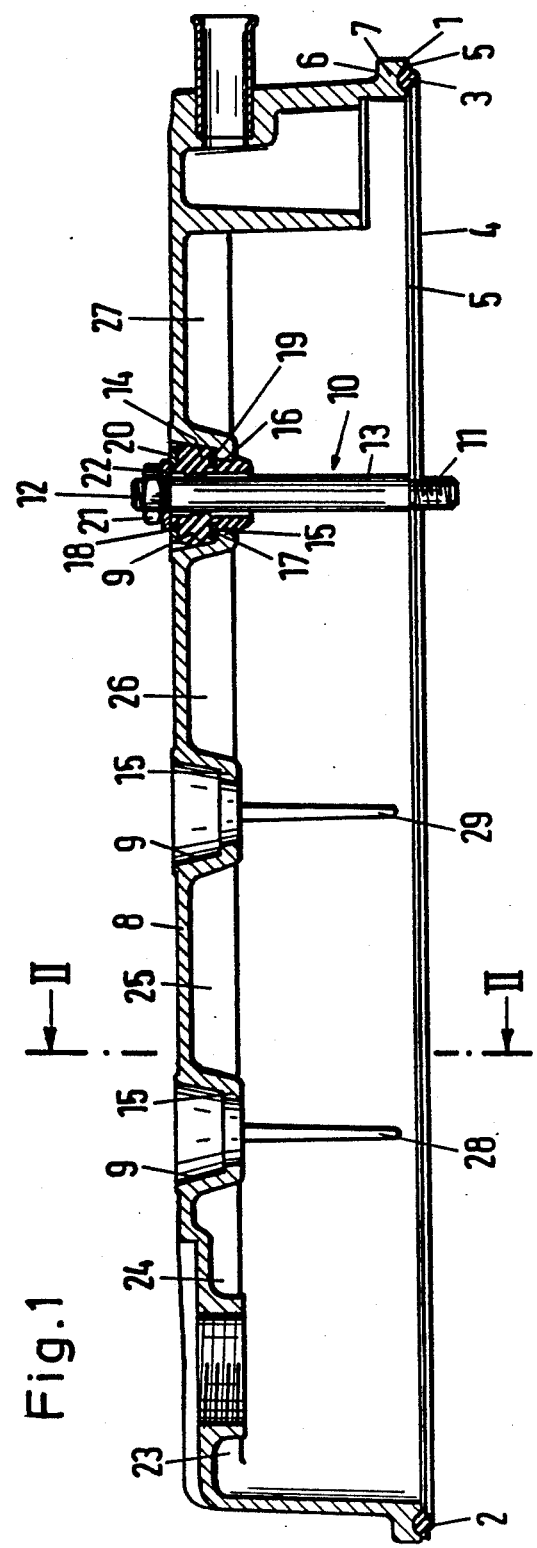
FIG. 1 is a sectional view of a cylinder head cover with the improved gasket, the section being taken in the direction of arrows as seen from the line I—I in FIG. 2.

The improved cylinder head cover comprises a hood- or pan-shaped body of aluminum and serves to overlie the overhead valve mechanism on the cylinder head of an internal combustion engine. Reference may be had, for example, to page 54 of "Principles of Automotive Vehicles" (Departments of the Army and the Air Force, January 1956). The cylinder head is located at a level below the body of the cover, as seen in FIGS. 1 to 3, and the cover further comprises a novel and improved cover gasket 3 a portion of which is installed in a recess 2 constituting a circumferentially complete annular groove provided in a marginal portion 1 forming part of a circumferentially complete sidewall extending downwardly from a bottom wall 8 of the pan-shaped body of the cover. The concave surface bounding the recess or groove 2 in the marginal portion 1 of the body has a substantially semicircular cross-sectional outline and the marginal portion 1 surrounds a cavity which is defined by the body and can receive a rocker arm shaft, rocker arms, valve springs, valve guides and other component parts which are normally installed above the cylinder head.

The cover gasket 3 is made of a heat- and oil-resistant material and includes a shaped sealing element which can consist, for example, of silicon rubber, nitryl rubber or polyacrylate rubber. In accordance with a feature of the invention, the sealing element of the gasket 3 is formed directly on the marginal portion 1 of the body of the cover and is caused to strongly adhere to the surface bounding the groove 2 due to the application of one or more coupling agents. The illustrated elastomeric sealing element has a circumferentially complete protuberance 4 which is bounded by a convex surface and comes in direct sealing engagement with a cylinder head, and two circumferentially complete ribs 5 which overlie the underside of the marginal portion 1 at the respective sides of the groove 2 and are squeezed between the marginal portion and the cylinder head when the cover is properly applied to the cylinder head by means of one or more fasteners including stud bolts 10 one of which is shown in FIG. 1.

The coupling agent is preferably silane if the sealing element of the gasket is made of silicon rubber. Silane is dissolved in xylene and is applied in the form of a thin layer to the surface bounding the groove 2. The layer further overlies the underside of the marginal portion 1 at the inner and outer sides of the groove 2 so as to ensure adherence of ribs 5 to the marginal portion 1 when the making of the gasket 3 is completed. The body of the cover (or at least the marginal portion 1 of the body) is heated prior to and/or during application of the dissolved coupling agent. The marginal portion 1 is then overlapped by a suitable mold M of at least two parts, which cooperates with the marginal portion to define a mold cavity having a cross-sectional outline corresponding to that of the finished sealing element including the protuberance 4, the ribs 5 and the portion in the groove 2. Such mold M defines at least one nozzle N for injection of plasticized silicon rubber at a temperature of approximately 110° C. into the mold cavity. The injected mass of silicon rubber is then heated to approximately 250° C. so as to react with the layer of silane and to form therewith a gasket having a predetermined cross-sectional outline. In the next step, the material in the mold cavity is cooled so that the material of the sealing element sets before the form is removed to expose a finished gasket 3 which is bonded to the marginal portion 1 and can be deformed in response to application against a cylinder head.

The aforementioned mold M is preferably provided with a first sharp edge $E_1$ which is pressed into the underside of the marginal portion 1 inwardly of the groove 2 (along the left-hand side of the left-hand rib 5 shown in FIG. 3) and a second sharp edge $E_2$ which is pressed into the underside of the marginal portion adjacent the right-hand side of the right-hand rib 5 of FIG. 3. Such mold M further engages the upper side 6 of an outwardly extending flange 7 forming part of or constituting the marginal portion 1. The mold overlies the flange 7 during injection and cooling of plasticized silicon rubber.

The thus obtained gasket 3 not only exhibits a desirable elasticity which ensures the establishment of a reliable seal between the marginal portion 1 and the adjacent portion of a cylinder head but the gasket also ensures that the underside of the marginal portion 1 need not be subjected to a secondary treatment prior to attachment of the cover to a cylinder head because the central portion and the ribs 5 of the elastic sealing element of the gasket 3 overlie a substantial part of the underside of the marginal portion and are in proper sealing engagement with such underside regardless of unevennesses (if any) in the underside.

Adequate bonding of certain other types of rubber might require the application of several layers of coupling agent, e.g., a first layer which is capable of properly adhering to the material of the elastic sealing element, i.e., one layer can be bonded to metal and the other layer can be bonded to the one layer and to rubber.

The bottom wall 8 of the body of the cover has three equidistant holes 9 which communicate with the cavity within the confines of the marginal portion 1 and each of which receives with play a discrete fastener 10 having two spaced-apart externally threaded end portions 11 and 12. Only one fastener 10 (in the form of a stud bolt) is actually shown in FIG. 1. The median or intermediate portion 13 of the fastener 10 is devoid of external threads, and its length determines the extent to which the elastic sealing element of the gasket 3 can be compressed and deformed between the marginal portion 1 and the adjacent portion of a cylinder head.

Each of the holes 9 receives a sleeve-like sealing ring 14 which is made of rubber or other suitable elastomeric material having a Shore hardness preferably exceeding that of the sealing element of the gasket 3. Each ring 14 sealingly engages the smooth median portion 13 of the respective fastener 10 beneath the externally threaded portion 12, and each ring 14 has two end faces with metallic washers 17 and 18 adjacent to or embedded in the respective end faces. When the threaded portion 11 mates with an internally threaded portion of a cylinder head and the externally threaded portion 12 mates with a nut 21 which overlies a washer 22 overlying the external 20 surface of the washer 18, the external surface 19 of the washer 17 bears against the internal shoulder provided in a cupped portion 15 of the bottom wall 8. The internal surface of the cupped portion 15 is then sealingly engaged by the peripheral surface of the respective sealing ring 14. As shown in FIG. 1, the washer 17 can be recessed into a circumferential groove 16 of the respective sealing ring 14 and the latter extends inwardly beyond such washer 17 to fill the smallest-diameter portion of the respective hole 9.

In order to affix the improved cover to a cylinder head, the lower portions 11 of the three fasteners 10 are screwed into tapped holes or bores in the top wall of the cylinder head. The sealing rings 14 are installed in the respective holes 9 of the bottom wall 8 and the cover is placed over the cylinder head so that each fastener 10 extends through and upwardly beyond the respective sealing ring 14. The washers 22 are placed over the exposed surfaces 20 of the respective washers 18 and the nuts 21 are applied to deform the rings 14 into sealing engagement with the adjacent internal surfaces of the respective cup-shaped portions 15. The length of the median portion 13 of each fastener 10 is selected in such a way that, when the portions 11 are in full mesh with the top wall of the cylinder head and the nuts 21 are fully applied, the rings 14 are in proper sealing engagement with the respective fasteners 10 and with the portions 15 while the gasket 3 is in adequate sealing engagement with the adjacent portion of the cylinder head.

The rings 14 not only establish seals between the respective fasteners 10 and the corresponding cup-shaped portions 15 but they also serve as means for damping noise which would have been transmitted from the cylinder head to the cover by way of the respective fasteners 10. The reason is that the rings 14 prevent the establishment of a direct metallic contact between the fasteners 10 and the bottom wall 8 of the body of the improved cover. It can be said that the rings 14 perform a desirable sealing, force-transmitting and vibration-damping action.

The body of the improved cover is preferably reinforced by one or more ribs which are provided in the cavity bounded by the inner side of the bottom wall 8 and the inner side of the sidewall of the body. FIGS. 1 and 2 show several reinforcing members in the form of ribs 23 to 30. The ribs 23–27 extend longitudinally of the bottom wall 8 between and outwardly of the holes 9, and the remaining ribs (including the ribs 28–30) cross the ribs 23–28 in the region of the plane including the axes of the holes 9. A substantially uniform or nearly uniform distribution of reinforcing ribs ensures a desirable transfer of tensioning forces from the nuts 21 to the gasket 3 and hence a uniform sealing action all the way along the marginal portion 1.

An important advantage of the improved cover and of its gasket 3 is that the gasket invariably adheres to the body of the cover in an optimum position for engagement with the adjacent wall of a cylinder head. This simplifies the attachment of the cover to and its detachment from a cylinder head because the gasket need not be manipulated as a discrete part. Moreover, the coupling agent ensures that the sealing element of the gasket 3 can expand or undergo deformation only in the desired direction or directions which are necessary to establish a reliable seal between the marginal portion 1 of the body of the cover and the cylinder head. Still further, the sealing action of the gasket 3 is not affected by repeated attachment of the cover to or its detachment from the cylinder head, i.e., the useful life of the gasket normally matches that of the metallic body of the cover. In addition, the marginal portion 1 of the metallic body of the cover constitutes one component of the composite mold which is needed to shape the plasticized material that forms the elastic element subsequent to cooling and adequate adherence to the surface bounding the groove 2 in the marginal portion 1. Therefore, a relatively simple additional mold suffices to define with the marginal portion 1 a mold cavity for reception of plasticized elastomeric material which must set in order to be adequately bonded to the marginal portion 1 (by way of the layer or layers or coupling agent) and to assume a shape (such as that shown in FIG. 3) which is best suited to ensure the establishment of a reliable seal between the marginal portion 1 and the adjacent portion of a cylinder head.

The groove 2 or an analogous recess constitutes an optional but desirable feature of the marginal portion 1. An advantage of the groove 2 is that it enlarges the area of contact between the layer or layers of coupling agent and the elastomeric material and thus ensures the establishment of a more reliable bond between the cooled elastomeric material (elastic seal) and the marginal portion 1.

The flange 7 also constitutes an optional but desirable feature of the marginal portion 1. This flange can enlarge the area of contact between the layer or layers of coupling agent and the marginal portion 1. In addition, the flange 7 can serve as a means for carrying the afore-discussed mold which cooperates with the marginal portion 1 to define a circumferentially complete cavity for reception of plasticized elastomeric material which is to be cooled in order to form the elastic sealing element of the gasket 3.

The making of holes 9 in the bottom wall 8 of the body of the improved cover is desirable and advantageous because the fasteners 10 need not penetrate through the gasket 3. Therefore, the making of the gasket 3 involves a relatively simple and time-saving operation because there is no need to provide holes for the passage of fastener means.

The fasteners 10, the cover, the washers 22 and the nuts 21 can be mounted by a robot so that the attachment of the cover to a cylinder head can be fully automated. The metallic washers 17, 18 are optional but desirable; they ensure that the sealing rings 14 invariably undergo deformation in desired directions so as to sealingly engage the respective fasteners 10 and to sealingly engage the internal surfaces of the respective cup-shaped portions 15 when the nuts 21 are driven home to exert an axially oriented stress upon the respective sealing rings.

Since the gasket 3 is formed directly on the marginal portion 1 of the body of the improved cover, one invariably ensures that at least the major part of the gasket assumes an optimum shape which is best suited to ensure that the gasket is in adequate sealing engagement with the body of the cover. This will be readily appreciated since the marginal portion 1 and its flange 7 constitute at least one-half of the mold into which the plasticized elastomeric material is injected in order to form the elastic sealing element of the gasket when the injecting and cooling steps are completed. The configuration of the underside of the marginal portion 1 determines the configuration of the corresponding portion of the gasket 3, and the layer or layers of coupling agent invariably follow the outline of the marginal portion 1, the same as the mass of injected elastomeric material which is flowable in the course of the injecting step so that it contacts the entire exposed surface of the single layer or the outer layer of coupling agent which overlies the selected portion of the underside of the marginal portion 1. The utilization of marginal portion 1 as one half or one component of the mold for injection of plasticized elastomeric material contributes to lower cost of the gasket 3 and ensures that at least the major part of the gasket assumes an optimum shape to thus ensure the establishment of a reliable seal between the marginal portion 1 and the adjacent portion of a cylinder head. The composite mold is relatively simple because it requires only one separable part, namely the component which is connectable to the flange 7 and has sharp edges engaging the underside of the marginal portion at the outer sides of the spaces which are to receive material to form the ribs 5 of the finished sealing element of the gasket 3.

While it is equally within the purview of the invention to install the fasteners 10, or to install additional fasteners, in such a way that they extend through the gasket 3 (which is customary in certain conventional covers for cylinder heads), the placing of fasteners into holes 9 which are remote from the marginal portion 1 is desirable and advantageous because a fastener which passes through the gasket invariably weakens the corresponding portion of the gasket so that the dimensions of the gasket must be enlarged or one must employ a more complex mold which is designed with a view to reinforce the elastomeric sealing element around a fastener which passes through the gasket.

The sealing rings 14 for the fasteners 10 which pass through the holes 9 in the bottom wall 8 of the body of the improved cover can perform the desirable function of preventing the transmission of vibrations from the cylinder head to the body of the cover. The placing of fasteners 10 into holes 9 which are provided in the bottom wall 8 of the body of the improved cover, rather than into holes of the gasket, renders it possible to form a more reliable seal between the marginal portion 1 and the adjacent portion of the cylinder head because the elastic sealing element of the gasket 3 can constitute a circumferentially complete part of constant cross-sectional area each and every portion of which produces a predictable sealing action. The median portions 13 of the fasteners 10 ensure that the sealing rings 14 and/or the elastic sealing element of the gasket 3 cannot undergo excessive deformation which could result in cold flow and would create problems in connection with adequate sealing during renewed attachment of the cover.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

We claim:

1. A cylinder head cover comprising a hollow body defining at least one cavity and having a marginal portion arranged to be placed adjacent a cylinder head and surrounding said at least one cavity; and a cover gasket provided on said marginal portion and including a sealing element of elastic material, and at least one coupling agent between said sealing element and said marginal portion, said material being applied at an elevated temperature in plasticized state and having a predetermined outline as a result of shaping between the at least one coupling agent on said marginal portion and a separable mold during curing at said elevated temperature.

2. The cylinder head cover of claim 1, wherein said marginal portion has a recess for a portion of said gasket.

3. The cylinder head cover of claim 2, wherein said recess includes a circumferentially complete groove.

4. The cylinder head cover of claim 1, wherein said marginal portion includes an outwardly extending flange.

5. The cylinder head cover of claim 1, wherein said body has at least one hole spaced apart from said marginal portion and communicating with said cavity, and further comprising an elongated fastener arranged to secure the body t a cylinder head and extending through said hole, and an elastic sealing ring installed in said hole in sealing engagement with said body, sealingly surrounding said fastener and being deformable in response to application of said fastener to deform said gasket between said marginal portion and a cylinder head.

6. The cylinder head cover of claim 5, wherein said body includes a pan having a bottom wall provided with said hole and a sidewall including said marginal portion.

7. The cylinder head cover of claim 5, wherein said fastener includes a stud bolt having spaced apart first and second externally threaded portions, one of said externally threaded portions being movable into mesh with an internally threaded portion of a cylinder head and the other of said externally threaded portions being engageable with a nut externally of said body to urge the marginal portion of said body toward the cylinder head whereby said gasket undergoes deformation the extent of which is dependent, at least in part, on the distance between the externally threaded portions of said stud bolt.

8. The cylinder head cover of claim 5, wherein said sealing ring has two end faces and further comprising metallic washers adjacent said end faces and having exposed surfaces one of which bears against said body when the fastener is applied to secure the body to a cylinder head.

9. The cylinder head cover of claim 5, wherein said reinforcing means comprises ribs in said cavity.

10. The cylinder head cover of claim 1, wherein said body has reinforcing means.

11. A method of forming a sealing gasket on a cylinder head cover of the type having a hollow body defining at least one cavity and including a marginal portion arranged to be placed adjacent a cylinder head and surrounding the cavity, comprising the steps of coating the marginal portion with at least one layer of a coupling agent; applying over the coupling agent a mass of plasticized elastomeric material which sets in response to curing and thereby adheres to the coupling agent; shaping the applied mass of elastomeric material on the at least one layer of coupling agent between the marginal portion and a separable mold so as to impart to the mass the configuration of a sealing element having a predetermined cross-sectional outline; and curing the shaped elastomeric material.

12. The method of claim 11, wherein said elastomeric material is selected from the group consisting of silicon rubber, nitryl rubber and polyacrylate rubber.

13. The method of claim 11, wherein the coupling agent contains silane.

14. The method of claim 11, wherein said applying step includes injecting the plasticized material between the at least one layer and the mold so that the marginal portion and the mold cooperate to determine the outline of the sealing element.

* * * * *